United States Patent [19]

Landry

[11] 4,397,227

[45] Aug. 9, 1983

[54] COVERED TOASTER FOR ENERGY SAVING AND FASTER TOASTING

[76] Inventor: Jean-Guy Landry, 5999 Ave Auteuil, Brossard, P.Q., Canada, J4Z 1N1

[21] Appl. No.: 277,337

[22] Filed: Jun. 25, 1981

[51] Int. Cl.³ ............................................. A47J 37/08
[52] U.S. Cl. ...................................... 99/334; 99/337; 99/391
[58] Field of Search ................. 99/325, 337, 334, 335, 99/326, 327, 328, 329 R, 389, 391, 390, 385

[56] References Cited

U.S. PATENT DOCUMENTS 2,194,859  3/1940  Malmquist et al. .................... 99/328
3,760,713  9/1973  Sato ...................................... 99/391
4,254,695  3/1981  Landry .................................. 99/334

Primary Examiner—Billy J. Wilhite

[57] ABSTRACT

A toaster of the pop up type that is provided with a pivoting cover to save energy and toasting time and in which there is an upwardly displaceable cover lifting device or rod characterized by being arranged to fully open the cover without the toasts having to push up the cover to open it and without having to lower the bread carrier to close the cover. This toaster comprises a pop up device or member that upwardly pushes or propels the cover lifting rod but is not connected to be lowered with it to retract the cover lifting rod and close the cover.

4 Claims, 4 Drawing Figures

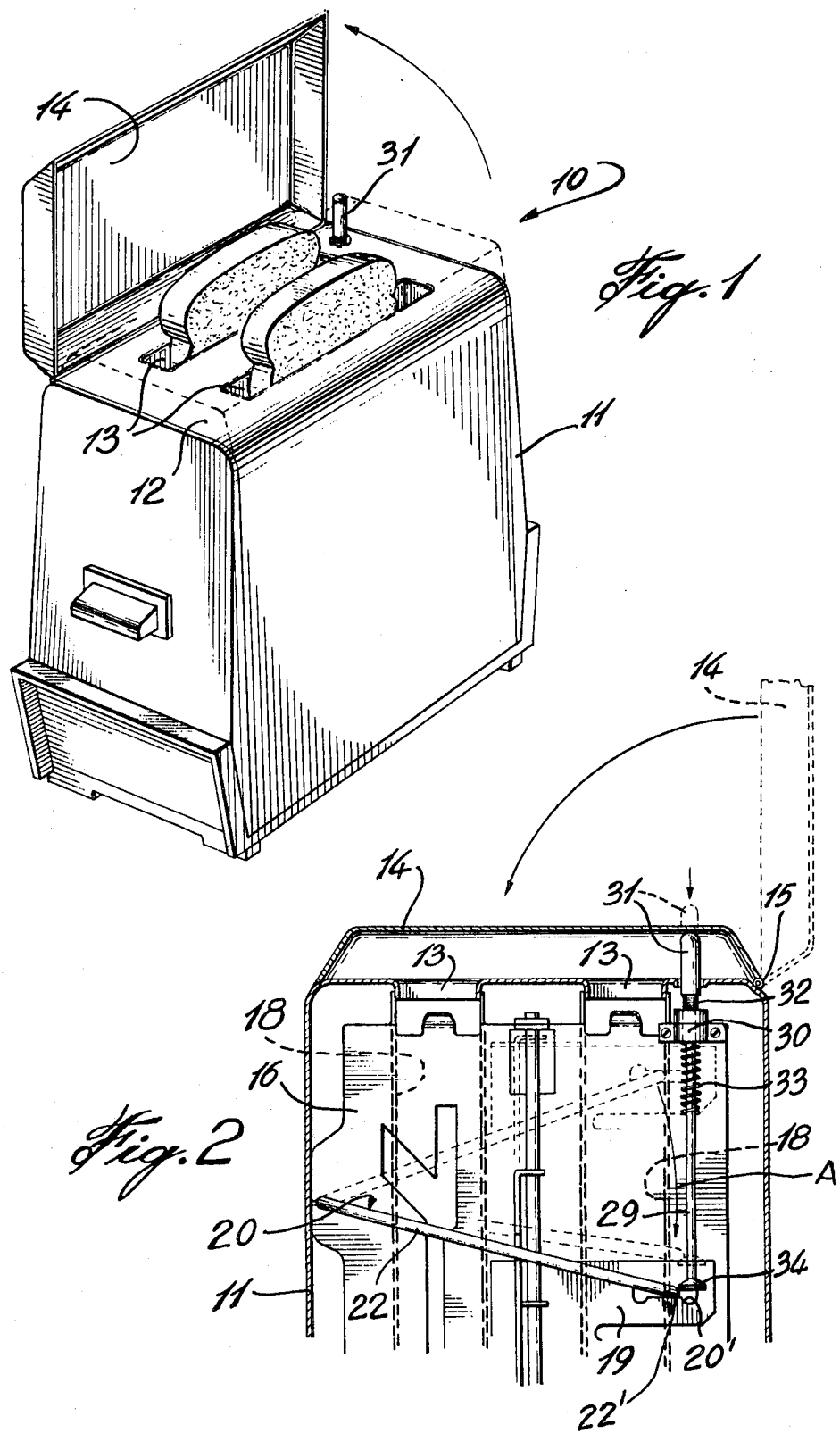

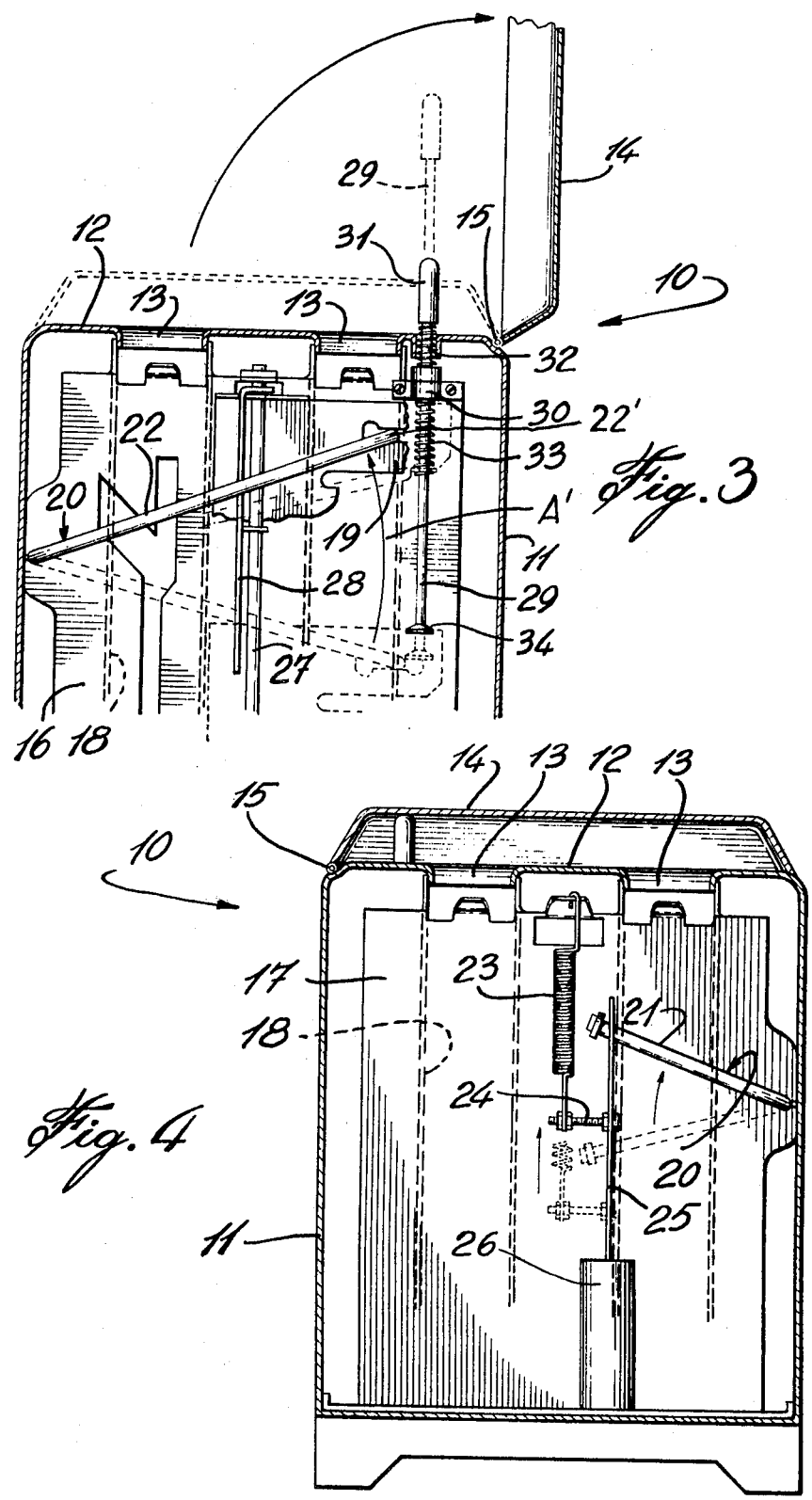

COVERED TOASTER FOR ENERGY SAVING AND FASTER TOASTING

FIELD OF THE INVENTION

The present invention relates to a toaster in particular to a toaster provided with a cover and of the pop-up type.

DESCRIPTION OF THE PRIOR ART

The toaster of the above type is characterized by a top provided with slots into which the slices of bread are inserted and lowered and in which there is a mechanism to pop up or lift the slices of bread after their toasting.

It is found desirable to cover such toaster during toasting to minimize the egress and wastage of heat through the slots and to achieve faster and more uniform toasting. This has been done and more pertinently as defined in Applicant's U.S. Pat. No. 4,254,695 dated Mar. 10, 1981. That patent defines a toaster in which the cover is opened by a cover lifting rod in cooperation with the upward movement of the popping up toasts.

SUMMARY OF THE INVENTION

It is a general object of the present invention to provide a covered toaster of the above type wherein the cover lifting rod totally and exclusively open the cover; that is without the toast having to upwardly lift the cover and that is thus operative even for smaller slices of bread.

It is another general object of the present invention to provide a covered toaster of the above type that includes a cover lifting device that is not dependent on lowering of the toast carrier to allow closing of the cover and consequently that is downwardly retracted indepently of the toast carrier and the associated actuation of the electric switch.

It is another object of the present invention to provide a covered toaster of the above type that includes a cover lifting rod or device operatively projecting only a limited height above the top of the toaster, that can be easily pushed down by the cover when closing the latter, and that is positioned near the hinge of the cover to pivot the latter sufficiently far to fully open it.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings; in which:

FIG. 1 is a perspective view of a covered toaster of the pop up type according to the present invention;

FIG. 2 is a cross sectional view of the upper portion of the toaster of FIG. 1 as taken transversely at one end of the toaster;

FIG. 3 is a view similar to the view of FIG. 2 but with the cover in open rather than in closed position;

FIG. 4 is a cross sectional view taken transversely through the other end of the toaster.

The illustrated toaster 10 is of the pop up type and includes a housing 11 defining a generally flat top 12 in which are cut a pair of slots 13 extending lengthwise longitudinally of the toaster. A shallow cover 14 is freely pivoted on the housing 11 by a hinge 15 extending along one longitudinal edge of the top 12. Insulation, not shown, is preferably provided in the shallow inside cavity in the cover 14 to minimize the heat loss through the cover. The location of hinge 15 relative to cover 14 is such that when cover 14 is open to an upright position as shown in FIGS. 1 and 3, it will remain in said position until manually closed.

The toaster conventionally includes a pair of internal transverse end plates 16, 17 of known construction at the opposite ends inside the toaster. The slots 13 downwardly extend from the top 12 into a pair of bread holding compartments 18. Electric toasting elements and a pop-up mechanism of any appropriate construction, not shown, are conventionally mounted in the toaster in operative cooperation with the slots 13 and compartments 18 to toast a pair of slices of bread and to pop up the toasts when ready. In the illustrated toaster, the pop-up mechanism includes a plate 19 slidable up and down outward of the internal end plate 16 and parallel to it. The plate 19 is formed with a guide slot 20' that extends transversely of the toaster. The pop-up mechanism also includes a pop up device in the form of a generally U shaped rod 20, of known construction and operation. The rod 20 includes an intermediate portion extending longitudinally of the toaster and defines a pivot axis around which are pivotable the opposite end portions 21 and 22 of the U shaped rod 20. A mechanism, of known construction, is provided to upwardly bias and pivot the ends 21, 22 of the rod 20. That mechanism includes a tension spring 23 fixedly attached at its upper end to the body of the toaster and adjustably attached at its lower end by a bolt 24 to a piston rod 25 whose upper end of piston is damped in a cylinder 26. The piston rod 25 is pivotally attached to end 21 of the pop up rod 20 whereby spring 23 upwardly biases end portions 21 and 22 to an upwardly inclined position as shown in full lines in FIGS. 3 and 4.

The end portion 22 of the pop up rod 20 is engaged at its free bent end 22' in the slot 20' of plate 19. Plate 19 is guided on an upright guide rod 27 and a manually operated actuator bar 28, all of known construction, serves to lower plate 19 and consequently to pivot the pop up rod downwardly where it is held in toasting position by a thermostatically controlled latch, which retains plate 19 in lowered position. This latch is not shown since it does not form part of the present invention. It will be noted that bent end 22' describes an arcuate path, shown by arrows A and A' in FIGS. 2 and 3 during pivoting of U shaped rod 20.

A cover lifting rod 29 is slidable endwise up and down in a guiding bracket 30. The rod 29 includes a capped upper end 31 that upwardly projects through a hole in the top 12 near the hinge 15 to engage the cover 14. A top coil spring 32 freely surrounds the cover lifting rod 29 between cap 31 and bracket 30 being free of the same to floatingly suspend rod 29 in the fully unbiased position shown in FIG. 3 where it projects only slightly higher than the height of the cover 14 when in closed position. The free floating position of the cover lifting rod 29 is shown in dotted line in FIG. 2 in relation with the height of the closed cover. A lower coil spring 33 freely surrounds rod 29 and depends from the underside of bracket 30 to which it is attached. The lower end of the cover lifting rod 29 includes an enlarged head 34 which is in the path of bent end 22' of end portion 22. Head 34 is shaped with an inclined top to allow the downward passage of the bent end 22' of the end portion 22 when the latter is lowered to its toasting position. That bent end 22' then underlies the enlarged head 34 to engage it and propel the rod 29 upward upon popping up of the pop up rod 20 and in particular of its end portion 22. The force of the spring 23 is then sufficient to upwardly propel the rod 29 substantially higher than its normal floating position, as shown in dotted lines in FIG. 3. The cover lifting rod 29 is sufficiently near of the hinge 15 and goes sufficiently high to fully open the cover 14 which then remains open. Lower spring 33 is normally not essential; it is used as a shock absorber to slow down rising rod 29 in the last part of its upward stroke should rod 29 be propelled upwardly with too great a force by bent end 22'. Due to its upward arcuate path as indicated by the arrow in FIG. 3, bent end 22', when raising rod 20, finally clears head 34 of said rod. Therefore, cover 14 can be closed without causing lowering of rod end portion 22.

When the cover is closed, the cover lifting rod 29 is only slightly retracted downward, between the dotted and full line positions of FIG. 2, only against the bias of the top spring 32 which serves as a shock absorber for the cover. If the cover 14 is closed when toasting, the head 34 comes closer to the bent end 22' of the end portion 22 and remains above it to be engaged by the latter upon popping up thereof. If the cover is closed when not toasting, the rod 29 is lowered exactly the same but since it is free of the transverse arm or end portion 22, the latter remains in its non-toasting upward position, as shown in FIG. 3. The switch, not shown, that is conventionally actuated by the lowering of the pop-up rod 20 to heat the slices of bread is therefore left undisturbed and there is no need to unplug the present toaster to close the cover without toasting. When end portion 22 is lowered to its toasting position while cover lifting rod 29 is in free floating position or in its lowermost position under the weight of the closed cover, bent end 22' will simply slide on head 34, clear and engage under the same.

It must be appreciated that small and non-essential details of construction may be made to adapt the concept of the present invention to other type of pop-up mechanisms without departing from the spirit and scope of the present invention defined by the appended claims. For instance, a different pop-up member than rod 20 may be used to upwardly propel a free-floating member or rod such as rod 29.

What I claim is:

1. In a toaster of the pop-up type, including a body, including a top and bread holding compartments upwardly opening through the top; and a pop-up device, mounted inside said body and operatively moveable up and down between an upper non-toasting position and a lower toasting position respectively and including a U-shaped rod having its bight pivoted in said body, a first leg attached to a spring which upwardly biases said first leg and a second leg having its end portion describing an arcuate path in a vertical plane between a lowered limit toasting position and an upper limit non-toasting position, said second leg being downwardly and upwardly inclined in a diretion away from said bight in the lowered and upper limit positions respectively of said second leg; in combination with:
   (a) a cover, hinged to the top of said body and selectively pivotable between a covering position overlying said top and bread holding compartments and an uncovering position extending upwardly from said top;
   (b) a cover lifting device, moveable up and down relative to the body operatively engageable with the hinged cover, and constructed and arranged to upwardly pivot the cover to the uncovering position and to allow lowering of the cover, said cover lifting device including a cover lifting rod slidable endwise up and down through the top of said body and including a lower end resting over said end portion of said second leg upon placing of the latter in toasting position, said cover lifting rod upwardly projecting from the top adjacent to the hinge of the cover, said cover lifting rod propelled upwardly and pivoting said cover to uncovering position by said end portion of said second leg upon upward pivoting movement by said second leg from its lowered toasting position to its upper non-toasting position, said end portion of said second leg clearing said lower end of said cover lifting rod during its upward pivoting movement allowing down movement of said cover lifting rod which in turn permits pivoting of said cover to its covering position while said pop-up device remains in its non-toasting position, said end portion of said second leg sliding on, clearing and engaging under the lower end of the lowered cover lifting rod during its downward pivoting movement to toasting position.

2. In a toaster as defined in claim 1, wherein first spring means upwardly bias said cover lifting rod against the cover in the covering position and act as a shock absorber for said cover when pivoting to its covering position.

3. In a toaster as defined in claim 2, wherein second spring means downwardly extend along said cover lifting rod and act as a shock absorber therefor in the last part of the upward stroke of said cover lifting rod.

4. In a toaster as defined in claim 1, 2 or 3, wherein said lower end of said cover lifting rod forms an enlarged head with an inclined top and a flat underface.

* * * * *